Jan. 27, 1970 H. C. SIBLEY 3,492,643
CODE VALIDATION SYSTEM
Filed Oct. 20, 1966
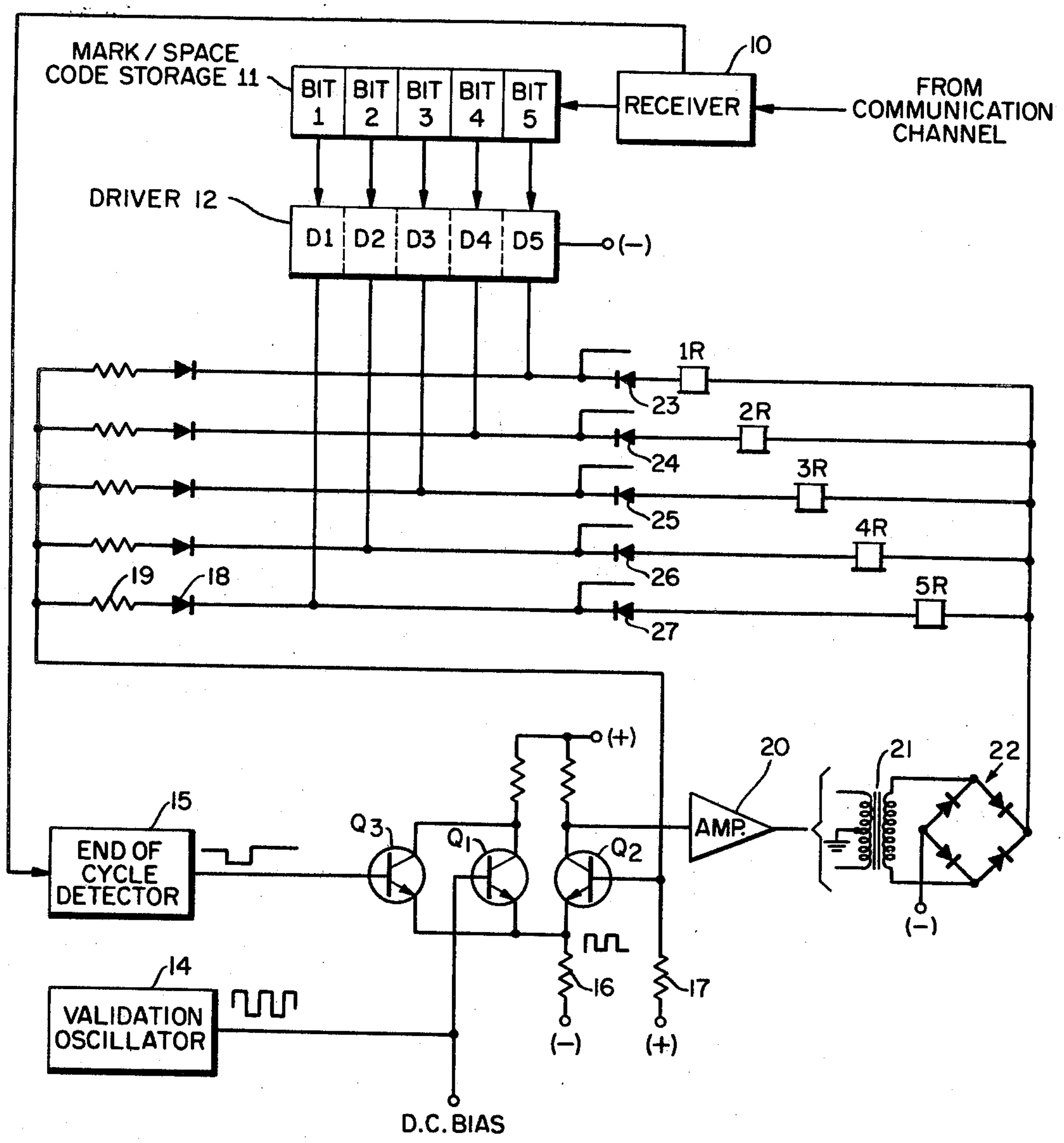
COMPARATOR 13
INVENTOR.
HENRY C. SIBLEY
BY Forest B. Hitchcock
his ATTORNEY

United States Patent Office 3,492,643
Patented Jan. 27, 1970

3,492,643
CODE VALIDATION SYSTEM

Henry C. Sibley, Adams Basin, N.Y., assignor to General Signal Corporation, Rochester, N.Y., a corporation of New York Filed Oct. 20, 1966, Ser. No. 588,042
Int. Cl. H03k 13/34
U.S. Cl. 340—146.1 7 Claims

ABSTRACT OF THE DISCLOSURE

A code validation circuit for a two out of five code having two transistors connected in multiple as a comparator wherein the bias of one of the transistors is determined by the number of code elements of a given character and an alternating current signal is applied as an input to the other transistor. An output alternating current signal from the transistors is a validation signal and is obtained only if the two element signal is present as an input to said one transistor and both transistors are operable.

This invention relates to code validation systems, and more particularly pertains to systems for validating codes always having the same number of bits of the same given element, such, for example, as for validating a two out of five code.

Where the integrity of code communication systems is so important as to require code checking, such as to require the use of a two out of five code check, it is highly desirable that failure of the checking apparatus be self-betraying and be so organized as to not allow delivery of an invalid message under any conditions. If solid state devices, such as transistors, are used as a part of the validity checking apparatus, it must be considered that they may fail by becoming open or short-circuited, and the validity check must not fail under these conditions.

SUMMARY OF INVENTION

The present invention provides a system of checking involving the use of two transistors in multiple as a comparator. Each of the transistors is operated below saturation at an intermediate D.C. output level. An alternating current signal is applied as an input to the first transistor and an A.C. component is present at the output of the second transistor only if the predetermined D.C. levels of the transistors are maintained. The D.C. level of the first transistor is governed by a fixed bias, and the D.C. level of the second transistor is dependent upon inputs from code storage of a multiple bid code wherein there is an input for each bit of a given same element, such, for example, as a mark. If there is only a predetermined number of inputs from the code storage, such as two out of five possible inputs, there is an A.C. output of the comparator because the values of the D.C. inputs to the two transistors of the comparator are substantially the same. If the D.C. input to the second transistor is different than the corresponding D.C. input to the first transistor, no A.C. validation signal will be generated as an output of the second transistor.

Both transistors of the comparator must operate below saturation and at substantially the same D.C. levels in order to generate an alternating current validation signal output from the second transistor. If the D.C. input to the second transistor is other than the input that would be provided by two and only two bits in a two out of five code, this D.C. level does not match the D.C. level of the input of the first transistor, and thus there will be no output of a validation signal by the second transistor. Also, if either of the transistors were to become open-circuited or shorted so as to render them inoperable to detect a two out of five code, there would be no alternating current validation output signal.

An object of the present invention is to provide a solid state system for validation of a code intended to have a fixed number of the same given elements that is fail-safe.

Another object of the present invention is to provide a solid state code validation system in the form of a comparator for comparing fixed and code-generated D.C. input levels.

Another object of the present invention is to generate an alternating current validation signal as an output of the comparator, only provided that fixed and variable D.C. inputs to the comparator are of substantially the same values.

Other objects, purposes and characteristic features of the present invention will be in part obvious from the accompanying drawing, and in part pointed out as the description of the invention progresses.

In describing the invention in detail, reference is made to the accompanying drawing which illustrates schematically a system according to one embodiment of the present invention for validation of a two out of five code received over a communication channel.

A receiver 10 is illustrated as being provided for receiving codes over a communication channel. It is common practice that the codes are received serially by the receiver 10, and converted to parallel output for the respective bits of the code as by the use of a shift register (not shown) or other comparable means. The receiver 10 is thus illustrated as having an output for setting up a mark/space code storage 11 having storage and output means for the respective bits of a code that is received. Outputs for the respective bits of the code stored in the code storage 11 are applied to a driver 12 which has driver circuits for the respective bits designated as D1, D2, D3, D4 and D5 respectively for the bits of a five bit code. Each of these driver stages has an output for the associated bit of the code. Outputs are generated for mark elements, and no output is generated for space elements.

A comparator 13 is provided for checking the validity of the code output of the driver 12. A validation oscillator 14 is provided for generating an alternating current as an input for the comparator 13, and an end of cycle pulse generator 15 is provided to generate a pulse to enable the comparator at a time when an execution of the code in the code storage 11 is desired.

Relays 1R through 5R are provided as decoding means wherein these relays are selectively energized in accordance with the condition of the code storage 11, provided there is an alternating current output signal from the comparator 13. The energization of any one of these relays is dependent upon the generation of a validation output signal by the comparator 13. Thus the energization of a relay R manifests the validity of the code stored in the code storage 11.

The comparator 13 comprises transistors Q1 and Q2, both of which, at time of code validation, conduct below saturation level in accordance with D.C. inputs to their base terminals. The alternating current signal generated by the validation oscillator 14 is also applied as an input to the base of transistor Q1, and thus this transistor has an output having an alternating current component generated across the resistor 16 which is common to both transistors Q1 and Q2.

The transistor Q2 has a direct current input applied to its base for each bit of the code storage 11 that has a mark stored therein. Thus a voltage divider network is provided including resistor 17 that is common to outputs of all bits of the code storage, and the D.C. voltage level at the base of transistor Q2 varies in accordance with the number of bits of the code storage 11 that has a mark stored therein. For the first bit, for example, the driver 12 has an output through its stage D1 wherein negative energy is applied as an output of D1 through diode 18, resistor 19 and resistor 17 to (+). Similar connections are made in the voltage divider network associated with the base of transistor Q2 for each of the other bits of the code storage 11. Thus the D.C. level of the base of transistor Q2 varies in accordance with the number of marks in the code stored by the code storage 11. If there are two and only two marks in the code stored by code storage 11, the D.C. level applied to the base of transistor Q2 substantially matches the D.C. bias applied to the base of transistor Q1. Under these conditions, and under these conditions only, when the comparator is enabled by a pulse output of the end of cycle detector 15, an alternating current signal output is provided by the transistor Q2 as a validation signal.

If the D.C. bias level of the transistor Q2 is higher than that of the transistor Q1 because of there not being two mark elements in the code in code storage 11, the transistor Q2 is saturated, and there is no validation signal output of this transistor. If, on the other hand, there are more than two marks in the code in code storage 11, the bias level of the transistor Q2 is below the bias level of the transistor Q1 to an extent to cause the transistor Q2 to be cut off and thus to provide no alternating current output component in its output signal. The failure of the transistor Q2 to have an alternating current output signal prevents the validation of the code. There is no validation signal output at an intermediate point in a cycle of operation for receiving a code in that the end of cycle detector 15 provides an input at this time to transistor Q3 which operates substantially at saturation to effectively shunt out the transistor Q1 and prevent an alternating current output to appear across the resistor 16, thus there is no alternating current validation signal output of the transistor Q2 except when enabled at the end of a cycle by the turning off of transistor Q3.

The validation signal output of the transistor Q2 is amplified by a suitable amplifier 20, and the output of amplifier 20 is applied through a transformer 21 and a fullwave rectifier 22 to windings of decoding relays 1R through 5R and through stages of the driver 12 corresponding to marks of a code stored in storage 11. The negative output of the fullwave rectifier 22 is connected to the negative power terminal for the driver 12 so that the relays 1R through 5R become selectively energized in accordance with the bits of the code of code storage 11 which are mark elements. Contacts of the relays 1R through 5R (not shown) can be used in a manner well known to those skilled in the art to control application apparatus in accordance with the code that has been executed by the generation of the validation signal.

The control of relays 1R through 5R in accordance with the code stored in code storage 11 can be considered as a means for decoding one word of a multiple word message that may be received by the receiver 10, and thus it is to be understood that other banks of decoding relays can be controlled by the driver 12 for other words as is indicated by connections that have been shown as being applied to the outputs of the respective stages D1 through D5 of the driver 12. Also the validation signal generated by the comparator 13 would be applied to the groups of decoding relays for the other words in a manner that should be readily apparent to those skilled in the art. Diodes 23–27 have been inserted in the control circuits for the relays 1R–5R for the purpose of isolating the relays relative to the respective words and for purposes of preventing run-around circuits.

Having thus described one embodiment of a validity checking system, it is desired to be understood that this form is selected to facilitate the disclosure of the invention, rather than to limit the number of forms the invention may assume. While the invention has been described in its preferred embodiment, it is to be understood that the words which have been used are words of description rather than of limitation, and that changes within the purview of the appending claims may be made without departing from the true spirit and scope of the invention in its broader aspects.

What is claimed is:

1. A system for checking the validity of a five bit code of binary elements as having two and only two of the five bits of the same given element comprising, means for generating an alternating current signal, a first variable output device having as inputs a direct current signal and the alternating current signal for providing an output signal having the alternating current signal characteristics, a second device connected in multiple with the first device and having an input direct current signal for each bit of the given element in the stored code for permitting an alternating current output signal of the devices jointly only when the stored code contains two and only two bits of the given element, and means for manifesting the validity of the stored two out of five code in response to the alternating current output of the devices.

2. The invention according to claim 1 wherein the first and second devices are transistors and direct current input means is provided for supplying substantially the same input potentials to both devices when and only when two of the elements of the five bit code are said same given element.

3. The invention according to claim 2 wherein the direct current input to the first device is fixed and wherein the direct current input to the second device varies with the number of said same given elements in the five bit code.

4. The invention according to claim 3 wherein the direct current inputs are applied to bases of the respective transistors.

5. A system for checking the validity of a multiple bit code of binary elements as having only a fixed number of the same given elements comprising, a comparator having first and second solid state devices connected in multiple, means for applying an alternating current and a fixed direct current input to the first device, and means for applying a direct current input to the second device proportional to the number of the code bits having said same given element, the comparator being operable when enabled to manifest validity of the code by generating an alternating current signal output of the devices jointly when and only when the direct current inputs of the first and second devices are substantially at the same level.

6. The system according to claim 5 wherein means is provided for storing identity of respective bits of a multiple element code and for periodically enabling the comparator to manifest validity of the stored code by generating a distinctive output signal.

7. The system according to claim 6 wherein decoding means is provided for decoding the code stored by said storing means and the decoding means is rendered effective in response to the distinctive signal output of the comparator.

References Cited

UNITED STATES PATENTS

| | | | |
|---|---|---|---|
| 2,484,226 | 10/1949 | Holden | 340—146.1 X |
| 2,688,050 | 8/1954 | Harris | 178—23 |
| 3,021,063 | 2/1962 | Von Kummer | 235—153 |
| 3,348,198 | 10/1967 | Winter | 340—146.1 |

MALCOLM A. MORRISON, Primary Examiner

CHARLES E. ATKINSON, Assistant Examiner

U.S. Cl. X.R.

235—153; 307—231